US008345176B2

(12) United States Patent
Ko

(10) Patent No.: US 8,345,176 B2
(45) Date of Patent: Jan. 1, 2013

(54) LIQUID CRYSTAL DISPLAY DEVICE

(75) Inventor: Byoung-Ick Ko, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 275 days.

(21) Appl. No.: 12/909,010

(22) Filed: Oct. 21, 2010

(65) Prior Publication Data

US 2011/0249209 A1 Oct. 13, 2011

(30) Foreign Application Priority Data

Apr. 9, 2010 (KR) ........................ 10-2010-0032808

(51) Int. Cl.
*G02F 1/136* (2006.01)

(52) U.S. Cl. ........................... 349/41; 349/139; 349/143

(58) Field of Classification Search .................... 349/41, 349/42, 48, 139, 142, 143, 144, 145, 149, 349/152
See application file for complete search history.

(56) References Cited

U.S. PATENT DOCUMENTS

| | | | | |
|---|---|---|---|---|
| 4,537,471 | A * | 8/1985 | Grinberg et al. | 349/48 |
| 7,193,599 | B2 * | 3/2007 | Kim et al. | 345/98 |
| 7,548,288 | B2 * | 6/2009 | Kim et al. | 349/84 |
| 7,764,350 | B2 * | 7/2010 | Kim | 349/143 |
| 2004/0095308 | A1 * | 5/2004 | Kim et al. | 345/99 |
| 2009/0290081 | A1 * | 11/2009 | Cho et al. | 349/42 |
| 2010/0002163 | A1 | 1/2010 | Sekine | |
| 2010/0045884 | A1 | 2/2010 | Ahn et al. | |
| 2010/0134707 | A1 * | 6/2010 | Kim et al. | 349/37 |
| 2010/0156771 | A1 | 6/2010 | Lee et al. | |
| 2011/0249209 | A1 * | 10/2011 | Ko | 349/41 |

FOREIGN PATENT DOCUMENTS

| | | | |
|---|---|---|---|
| JP | 10-133798 | | 5/1998 |
| KR | 10-0291770 | B1 | 3/2001 |
| KR | 10-2004-0055414 | A | 6/2004 |
| KR | 10-2004-0059322 | | 7/2004 |
| KR | 10-2006-0126231 | | 12/2006 |
| KR | 10-0801416 | B1 | 1/2008 |
| KR | 10-2008-0054545 | | 6/2008 |

* cited by examiner

*Primary Examiner* — Brian Healy
(74) *Attorney, Agent, or Firm* — Robert E. Bushnell, Esq.

(57) ABSTRACT

A LCD device that includes a gate driver transferring a plurality of gate signals to a plurality of gate lines, a gate driver transferring a plurality of gate signals to a plurality of data lines, and a pixel unit including a plurality of pixels arranged in a matrix form. The pixel unit includes a plurality of pixel pairs in each of which two corresponding pixels included in two neighboring pixel columns, respectively, and in the same pixel row, from among the plurality of pixels, are connected in common to a corresponding data line of the plurality of data lines and a corresponding gate line of the plurality of gate lines, and wherein a gate signal transferred to a predetermined pixel row through a corresponding gate line is transferred to a pixel on one side and a pixel on the other side from among a plurality of pixel pairs included in two pixel rows different from the predetermined pixel row, thereby controlling a switching operation.

13 Claims, 4 Drawing Sheets

LIQUID CRYSTAL DISPLAY DEVICE

CLAIM OF PRIORITY

This application makes reference to, incorporates the same herein, and claims all benefits accruing under 35 U.S.C. §119 from an application for earlier filed in the Korean Intellectual Property Office on Apr. 9, 2010 and there duly assigned Ser. No. 10-2010-0032808.

BACKGROUND OF THE INVENTION

1. Field of the Invention

The general inventive concept relates to a liquid crystal display (LCD) device.

2. Description of the Related Art

Recently, a variety of flat panel displays capable of reducing the drawbacks of a cathode ray tube, such as the weight and volume thereof, have been in development.

The flat panel displays include an LCD device, a field emission display (FED) device, a plasma display panel (PDP), an organic light emitting diode (OLED) display, and so on.

The above information disclosed in this Related Art section is only for enhancement of understanding of the background of the invention and therefore it may contain information that does not form the prior art that is already known in this country to a person of ordinary skill in the art.

SUMMARY OF THE INVENTION

Aspects of the present invention attempt to provide an LCD device in which a gate signal for controlling turning on/off of a switching element, such as a TFT, in each of the pixels of the LCD device, is used to control additional switching elements.

Aspects of the present invention are not limited to the above-mentioned object, and other technical objects that have not been mentioned above will become evident to those skilled in the art from the following description.

Aspects of the present invention provide for an LCD device, including a gate driver transferring a plurality of gate signals to a plurality of gate lines, a gate driver transferring a plurality of gate signals to a plurality of data lines, and a pixel unit including a plurality of pixels arranged in a matrix form. Here, the pixel unit includes a plurality of pixel pairs in each of which two corresponding pixels included in two neighboring pixel columns, respectively, and in the same pixel row, from among the plurality of pixels, are connected in common to a corresponding data line of the plurality of data lines and a corresponding gate line of the plurality of gate lines, and wherein a gate signal transferred to a predetermined pixel row through a corresponding gate line is transferred to a pixel on one side and a pixel on the other side from among a plurality of pixel pairs included in two pixel rows different from the predetermined pixel row, thereby controlling a switching operation.

An aspect of the present invention, during a period in which a switching element included in the pixel on one side of each of the plurality of pixel pairs is turned on and a period in which a switching element included in the pixel on the other side of the corresponding pixel pair is turned on, the pixel on one side and the pixel on the other side are charged to a data voltage according to the data signal through a corresponding data line connected in common thereto.

The turn-on period is not specially limited, but preferably can be one (1) horizontal cycle (1H).

The period in which the switching element included in the pixel on one side of each of the plurality of pixel pairs is turned on does not coincide with the period in which the switching element included in the pixel on the other side of the corresponding pixel pair is turned on. That is, the period in which the switching element included in the pixel on one side is turned on and the period in which the switching element included in the pixel on the other side is turned on are consecutive to each other, and they are charged to a data voltage according to the data signal transferred through the data line.

In an aspect of the present invention, the two pixel rows different from the predetermined pixel row may vary depending on the design forms of the pixel unit, but preferably may include a second pixel row anterior to the predetermined pixel row and a pixel row posterior to the predetermined pixel row.

In another aspect of the present invention, the gate driver generates a first selection signal and a second selection signal that may be shifted by a half cycle of the first selection signal. The gate driver may sequentially generate the plurality of gate signals, each having a first period in which the gate signal shifts to a gate-on voltage level at a point of time at which the first selection signal becomes active and then maintains the gate-on voltage level during 1.5 times a period in which a corresponding data voltage is charged and a second period in which the gate signal shifts to a gate-on voltage level at a point of time at which the second selection signal becomes active with a time interval of as much as the period in which the data voltage may be charged before the first period and then maintains the gate-on voltage level during a period half size of the period in which the data voltage may be charged and transfer the generated gate signals to the plurality of gate lines.

In the circuit configuration of the pixel, the active waveform of the first selection signal or the second selection signal generated by the gate driver may be a waveform shifted to a high state or a waveform shifted to a low state depending on the type of switching element. Likewise, the gate-on voltage level of the gate signal generated by the gate driver can be a high-level voltage or a low-level voltage depending on whether the switching element of the pixel is a PMOS transistor or an NMOS transistor.

In another aspect of the present invention, the charging period of the data voltage may not specially limited, but can vary depending on a circuit configuration of the pixel. The data voltage preferably may be charged during 2 horizontal cycles (2H).

Further, the first periods of neighboring gate signals of the plurality of gate signals can overlap with each other during one (1) horizontal cycle (1H), but is not limited thereto.

In another aspect of the present invention, the charging period of the corresponding data voltage may be a period in which the first period of a gate signal transferred in response to a predetermined pixel row overlaps with the first period of a gate signal transferred in response to a pixel row anterior to the predetermined pixel row, and a period in which the first period of the gate signal transferred in response to the predetermined pixel row overlaps with the second period of a gate signal transferred in response to a second pixel row posterior to the predetermined pixel row.

Each pixel on one side and the pixel on the other side of each of the plurality of pixel pairs may include a first switching element, including a gate terminal connected to the corresponding gate line, a source terminal connected to a drain terminal of a second switching element, and a drain terminal connected to one terminal of a liquid crystal element for charging a data voltage according to a corresponding data signal, and a second switching element, including a gate terminal connected to any one of two gate lines corresponding to the two pixel rows different from the predetermined pixel row, a source terminal connected to the corresponding data line, and a drain terminal connected to the source terminal of the first switching element. In this case, the first switching element and the second switching element may be turned on depending on voltage levels of a first gate signal transferred through the corresponding gate line and a second gate signal transferred through either one of the two gate lines corresponding to the two pixel rows different from the predetermined pixel row, thereby controlling the switching operation of the pixel.

The gate terminal of the second switching element of the pixel on one side is connected to a gate line corresponding to a pixel row anterior to the predetermined pixel row, and the gate terminal of the second switching element of the pixel on the other side is connected to a gate line corresponding to a second pixel row posterior to the predetermined pixel row.

The two pixel rows different from the predetermined pixel row may include a previous pixel row of the corresponding gate line and a subsequent second pixel row of the corresponding gate line, but is not limited thereto. The timing of the gate signal generated by the gate driver may also be changed in various ways according to the design.

During a period in which the first switching element and the second switching element of the pixel on one side are simultaneously turned on and a period in which the first switching element and the second switching element of the pixel on the other side are simultaneously turned on, the pixel on one side and the pixel on the other side may be charged to a data voltage according to a data signal from a corresponding data line connected in common to the pixel on one side and the pixel on the other side.

In accordance with the exemplary embodiments of the present invention, a gate signal for controlling the turning on/off of the switching element, such as a TFT, may be used to control additional switching elements. Accordingly, an LCD device capable of reducing a load for controlling additional elements and of reducing control lines for controlling the additional elements is provided.

Further, in accordance with the various aspects of the present invention, a gate signal for performing one turn-on function per frame is improved and used to control additional elements. Accordingly, the complexity of a pixel circuit can be reduced. In addition, a circuit configuration capable of reducing the number of data lines for supplying data to the pixels can be provided. Accordingly, there is an advantage in that the manufacturing cost for an LCD device can be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1:
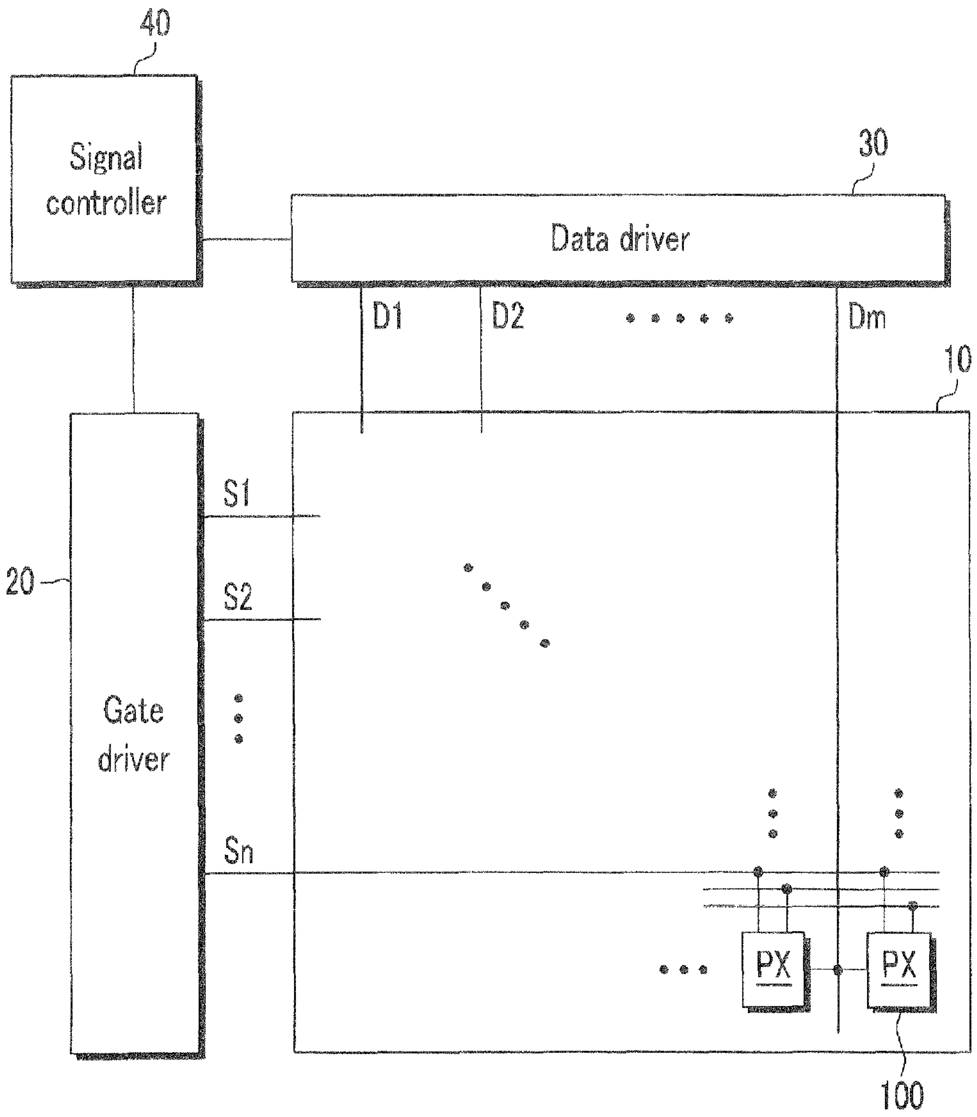
FIG. 1 is a block diagram of an LCD device according to an exemplary embodiment of the present invention.

Hereinafter, some exemplary embodiments of the present invention will be described with reference to the accompanying drawings in order for those skilled in the art to be able to readily implement them. As those skilled in the art would realize, the described embodiments may be modified in various different ways, all without departing from the spirit or scope of the present invention.

Further, in the exemplary embodiments, constituent elements having the same construction are assigned the same reference numerals and are representatively described in connection with a first exemplary embodiment. In the remaining embodiments, only constituent elements that are different from those of the first exemplary embodiment are described.

Wherever possible, the same reference numbers will be used throughout the drawings to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A typical LCD device includes two display plates, including pixel electrodes and a common electrode, and a liquid crystal layer with dielectric anisotropy interposed between the two display plates.

The pixel electrodes are arranged in a matrix form. The pixel electrodes are connected to respective switching elements, such as thin film transistors (TFTs) and are sequentially supplied with data voltages row by row.

The common electrode is formed over the entire surface of the display plate and supplied with a common voltage. From a viewpoint of a circuit, the pixel electrode, the common electrode, and the liquid crystal layer therebetween constitute a liquid crystal capacitor. The liquid crystal capacitor, together with the switching element connected thereto, becomes a basic unit forming a pixel.

In such an LCD device, an electric field is generated in the liquid crystal layer by supplying voltage to the two electrodes, and the transmittance of light passing through the liquid crystal layer is controlled through control of the intensity of the electric field, thereby obtaining a desired image.

In the flat panel display, a plurality of pixels connected in common to one scan line are connected to different data lines. Accordingly, if the number of pixels arranged in the direction of the scan lines and the direction of the data lines is increased in order to improve resolution, the number of data lines is increased in proportion to the number of pixels. Consequently, there are problems in that the number of data driving circuits included in a gate driver for supplying data to each of the pixels through the data lines is increased such that the manufacturing cost is increased.

Further, in order to drive the switching element of each pixel, such as a TFT, electrons are charged in synchronization with a gate signal transferred to each scan line. In this case, a problem arises because logic of additional switching is not controlled when the logic is generated.

FIG. 1 is a block diagram of an LCD device according to an exemplary embodiment of the present invention.

Referring to FIG. 1, the LCD device according to an exemplary embodiment of the present invention may include a pixel unit 10 including a plurality of pixels 100, a gate driver 20 for driving a plurality of gate lines S1 to Sn by supplying gate signals to the plurality of gate lines, a data driver 30 for driving a plurality of data lines D1 to Dm by supplying data signals to the plurality of data lines, and a signal controller 40 for controlling the gate driver 20 and the data driver 30.

The pixel unit 10 has the plurality of pixels 100 arranged in a matrix form. When the gate signal from a corresponding gate line is supplied to each of the plurality of pixels 100, the pixel receives the data signal from a corresponding data line and stores a data voltage corresponding to the data signal. Each of the plurality of pixels 100 rearranges the liquid crystal molecules of a liquid crystal layer so that they are proportional to a corresponding data voltage and displays an image.

In the pixel unit 10 of the LCD device shown in FIG. 1 according to an exemplary embodiment of the present invention, two corresponding pixels, included in respective neighboring pixel columns of the plurality of pixels 100 and included in the same pixel row, are arranged in the form of a pixel pair which is connected in common to one corresponding data line from among the plurality of data lines and one corresponding gate line from among the plurality of gate lines. Each of the pixels included in the pixel pair is further connected to the gate line of another row, in addition to the corresponding gate line connected thereto, so the switching of the pixel is controlled. A circuit configuration of the pixel unit 10 including a plurality of the pixel pairs is described in detail below with reference to FIG. 2.

In the exemplary embodiment of FIG. 1, the gate driver 20 generates the gate signals in response to a gate driving control signal supplied by the signal controller 40, and sequentially supplies the generated gate signals to the plurality of gate lines S1 to Sn electrically connected to the pixel unit 10. Here, a pixel row connected to a gate line to which a gate signal having a gate-on voltage is supplied and may be selected from among the plurality of pixel rows respectively connected to the gate lines S1 to Sn. The term "gate-on voltage" refers to a level that turns on the switching element of each of the plurality of pixels 100 included in the pixel unit 10 so that a data voltage corresponding to a data signal transferred to the gate terminal of the switching element is stored.

Here, the plurality of pixels 100 included in the pixel row selected by the gate line may be supplied with the data signal from a corresponding one of the plurality of data lines D1 to Dm. In the exemplary embodiment of the present invention, the pixel pair is connected in common to one data line and supplied in common with the data signal.

The data voltage corresponding to the supplied data signal may be charged during the time in which the gate signal having the gate-on voltage is maintained at the gate-on voltage level. Accordingly, liquid crystal molecules are rearranged to display an image.

In the exemplary embodiment of the present invention, the gate line connected to the selected pixel row is also connected to a plurality of pixels included in another pixel row, so the driving of the pixels included in the other pixel row can be controlled using a corresponding gate signal.

Further, the data driver 30 supplies the plurality of data signals to the plurality of data lines D1 to Dm. More particularly, the data driver 30 generates the plurality of data signals in response to an image data signal supplied by the signal controller 40 that has received an external video signal, and sequentially supplies the generated data signals to the pixel unit 100 through the plurality of data lines D1 to Dm in response to a data driving control signal.

The signal controller 40 generates the data driving control signal and the gate driving control signal in response to external synchronization signals. The data driving control signal generated by the signal controller 40 is supplied to the data driver 30. The gate driving control signal generated by the signal controller 40 may be supplied to the gate driver 20.

Further, the signal controller 40 converts an external video signal into an image data signal DATA and supplies the image data signal DATA to the data driver 30.

Figure 2:
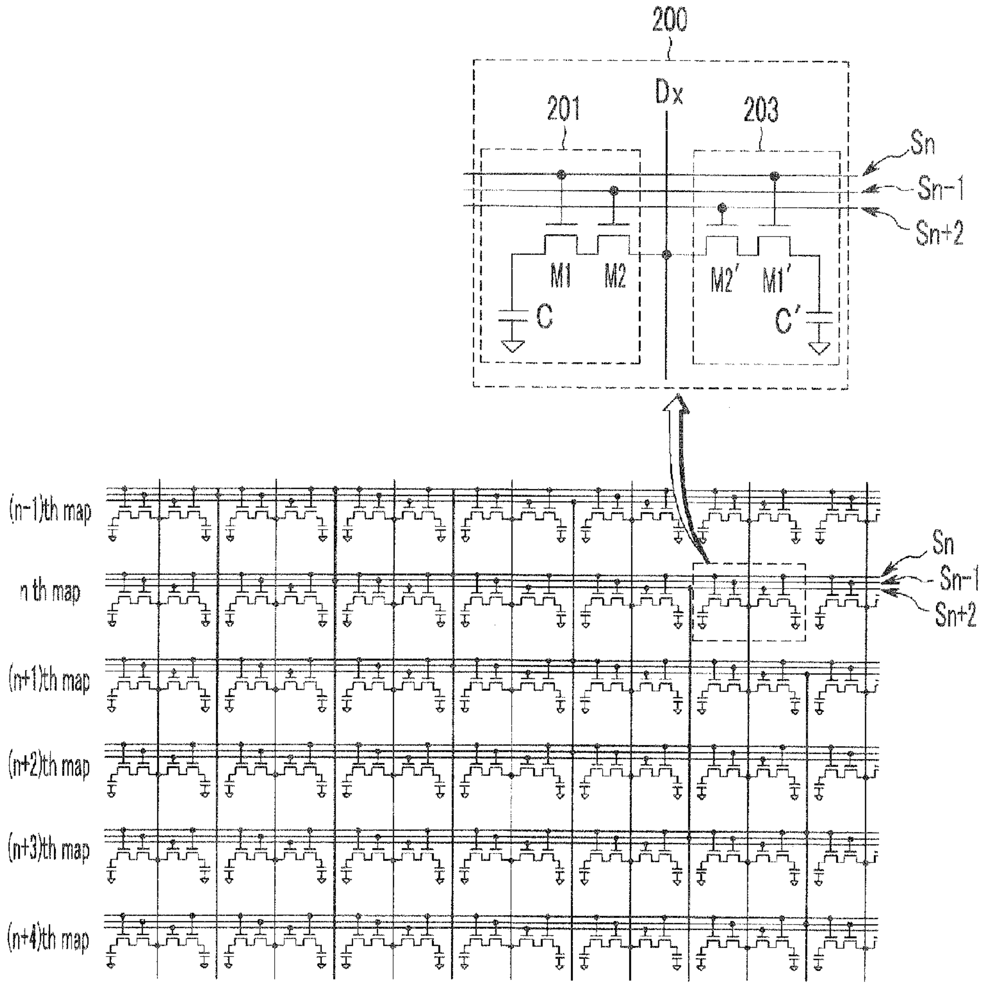
FIG. 2 shows a pixel circuit constituting a pixel unit in the LCD device of FIG. 1.

FIG. 2 shows a pixel circuit constituting a pixel unit in the LCD device of FIG. 1.

FIG. 2 is a pixel circuit showing part of the arrangement of the plurality of pixels 100 included in the pixel unit 10 in the LCD device shown in FIG. 1 according to the exemplary embodiment of the present invention.

The plurality of pixels 100 are arranged in a matrix form. FIG. 2 shows a plurality of pixels included in an $(n-1)^{th}$ row to an $(n+4)^{th}$ row, from among the plurality of pixels 100.

As can be seen from FIG. 2, two pixels included in two neighboring pixel columns, from among a plurality of pixels included in the same row, form one pixel pair. That is, in FIG. 2, two corresponding pixels 201 and 203 included in two neighboring pixel columns, from among a plurality of pixels included in the $n^{th}$ pixel row, form one pixel pair 200. The pixel unit 10 of the LCD device according to the exemplary embodiment of the present invention includes a plurality of the pixel pairs 200 that are arranged in a matrix form.

However, the above example is only an exemplary embodiment of the present invention, and the arrangement structure of the plurality of pixels 100 included in the pixel unit 10 is not limited to the present exemplary embodiment.

As can be seen from the enlarged figure of part of the circuit diagram of FIG. 2, the pixel pair 200 according to the exemplary embodiment of the present invention includes a pixel 201 on one side and a pixel 203 on the other side.

The pixel 201 on one side and the pixel 203 on the other side may be connected to a corresponding gate line Sn, corresponding to a pixel row corresponding to one common data line Dx (i.e., an $n^{th}$ pixel row). A gate signal Gn may be transferred through the gate line Sn connecting the plurality of pixels included in the $n^{th}$ pixel row.

Further, the plurality of pixels included in the $n^{th}$ pixel row are connected to gate lines corresponding two other pixels rows. That is, the plurality of pixels included in the $n^{th}$ pixel row may be connected to a gate line Sn−1 corresponding to a pixel row anterior to the corresponding pixel row (the $n^{th}$ pixel row), and to a gate line Sn+2 corresponding to a second pixel posterior to the corresponding pixel row (the $n^{th}$ pixel row).

Accordingly, the pixel 201 on one side from among the pixel pairs 200 included in the $n^{th}$ pixel row is further connected to the gate line Sn−1 corresponding to the $(n-1)^{th}$ pixel row, in addition to the gate line Sn corresponding to the $n^{th}$ pixel row, and is supplied with a gate signal Gn−1 through the gate line Sn−1. Further, the pixel 203 on the other side may be further connected to a gate line Sn+2 corresponding to the $(n+2)^{th}$ pixel row, in addition to the gate line Sn corresponding to the $n^{th}$ pixel row, and may be supplied with a gate signal Gn+2 through the gate line Sn+2.

More particularly, the pixel 201 on one side and the pixel 203 on the other side include first switching elements M1 and M1', liquid crystal elements C and C', and second switching elements M2 and M2' having one terminals connected to the first switching elements M1 and M1', respectively. The liquid crystal element electrically plays the same role as a capacitor, so it is indicated by the same symbol as the capacitor.

The first switching element M1 of the pixel 201 on one side includes a gate terminal connected to the gate line Sn connected to the $n^{th}$ pixel row, a source terminal connected to the drain terminal of the second switching element M2, and a drain terminal connected to one terminal of the liquid crystal element C for charging the data voltage of a corresponding data signal.

The second switching element M2 of the pixel 201 on one side includes a gate terminal connected to the gate line Sn−1 connected to the $(n-1)^{th}$ pixel row which is different from the corresponding $n^{th}$ pixel row and is anterior to the $n^{th}$ pixel row, a source terminal connected to the corresponding data line Dx, and the drain terminal connected to the source terminal of the first switching element M1.

Meanwhile, the first switching element M1' of the pixel 203 on the other side includes a gate terminal connected to the gate line Sn connected to the $n^{th}$ pixel row, a source terminal connected to the drain terminal of the second switching element M2', and a drain terminal connected to one terminal of the liquid crystal element C' for charging the data voltage of a corresponding data signal.

The second switching element M2' of the pixel 203 on the other side includes a gate terminal connected to the gate line Sn+2 connected to the $(n+2)^{th}$ pixel row which is different from the corresponding $n^{th}$ pixel row and is a second row posterior to the $n^{th}$ pixel row, a source terminal connected to the corresponding data line Dx, and the drain terminal connected to the source terminal of the first switching element M1'. The detailed pixel construction of the pixel pair 200 is not limited to the above exemplary embodiment and can be modified in various forms.

Although a gate signal having a gate-on voltage level is received from the gate line Sn connected to the $n^{th}$ pixel row, both of the pixel 201 on one side and the pixel 203 on the other side of the pixel pair 200 having the above construction are not turned on. The driving of each of the pixels may be controlled according to a voltage level of a gate signal received from a gate line connected to another pixel row.

That is, when a gate signal having a gate-on voltage level is supplied from the gate line Sn connected to the $n^{th}$ pixel row to the gate terminals of the first switching elements M1 and M1' of the pixel 201 on one side and the pixel 203 on the other side, the first switching elements M1 and M1' may be turned on but may not be supplied with a data voltage corresponding to a data signal, and the driving of the first switching elements M1 and M1' may be controlled depending on whether the remaining second switching elements M2 and M2' are turned on.

However, since the second switching elements M2 and M2' of the pixel 201 on one side and the pixel 203 on the other side are connected to different pixel rows from the $n^{th}$ pixel row, the driving of the second switching elements M2 and M2' may be changed according to voltage levels of gate signals connected to the different pixel rows.

If a gate signal having a gate-on voltage level is received from the gate line Sn−1 of the $(n-1)^{th}$ pixel row connected to the second switching element M2 of the pixel 201 on one side during the time in which a gate signal having a gate-on voltage level may be received from the gate line Sn connected to the $n^{th}$ pixel row, the second switching element M2 may be turned on and so all the pixels 201 on one side may be turned on. Accordingly, the liquid crystal element C of the pixel 201 on one side may be charged to a data voltage corresponding to a data signal from the corresponding data line Dx.

Meanwhile, if a gate signal having a gate-on voltage level is received from the gate line Sn+2 of the $(n+2)^{th}$ pixel row connected to the second switching element M2' of the pixel 203 on the other side during the time in which a gate signal having a gate-on voltage level is received from the gate line Sn connected to the $n^{th}$ pixel row, the second switching elements M2' may be turned on and so all the pixels 201 on the other side may be turned on. Accordingly, the liquid crystal element C' of the pixel 203 on the other side may be charged to a data voltage corresponding to a data signal from the corresponding data line Dx.

Therefore, in accordance with the exemplary embodiment of the present invention, in controlling a plurality of pixels included in a corresponding pixel row (e.g., the $n^{th}$ pixel row), the driving of a pixel pair may be controlled according to a period in which the turn-on level of a gate signal received from a gate line connected to another pixel row (e.g., the $(n-1)^{th}$ pixel row and the $(n+2)^{th}$ pixel row), in addition to a gate signal received from a gate line connected to the corresponding pixel row, may be sustained.

Since two pixels form a pair and share one corresponding data line, the number of data lines may be reduced. Furthermore, an additional control signal for controlling switching elements included in two pixels sharing one data line is not required.

Figure 3:
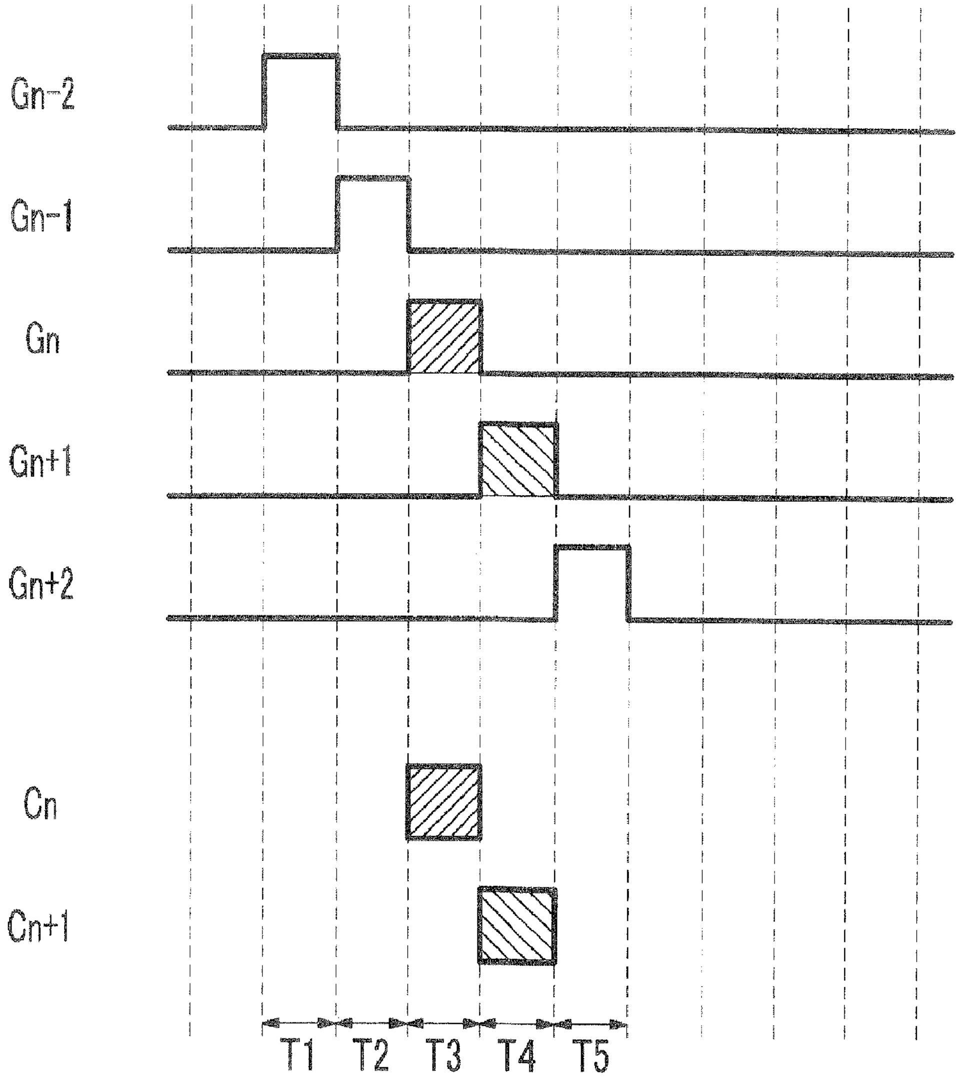
FIG. 3 is a timing diagram of gate signals transferred to the pixel unit of an existing LCD device.
Figure 4:
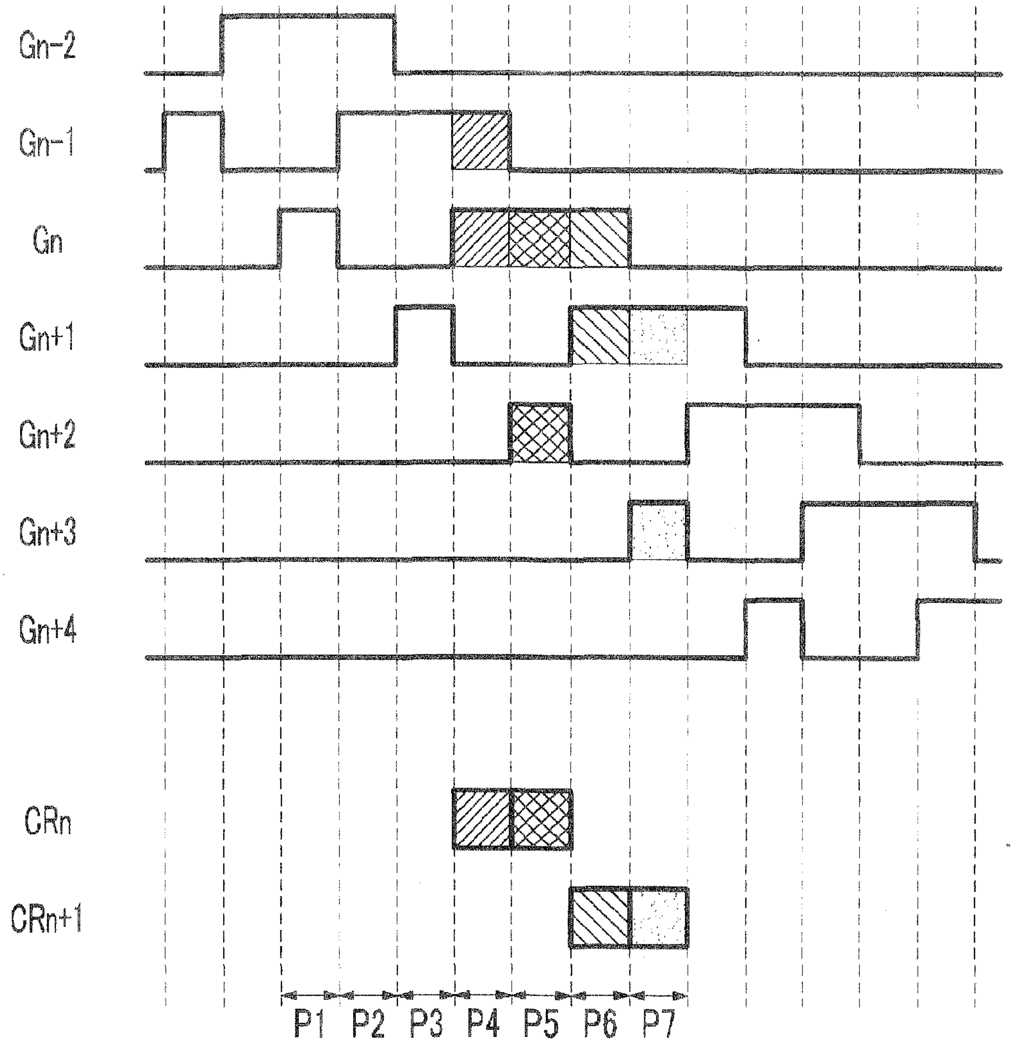
FIG. 4 is a timing diagram of gate signals transferred to the pixel unit of the LCD device according to an exemplary embodiment of the present invention.

FIG. 3 is a timing diagram of gate signals transferred to the pixel unit of an existing LCD device, and FIG. 4 is a timing diagram of gate signals transferred to the pixel unit of the LCD device according to an exemplary embodiment of the present invention.

A comparison of the timing diagrams shown in FIGS. 3 and 4 is described below. From FIG. 4, it can be seen that the methods of driving corresponding pixels are changed according to driving timings of the gate signals transferred through the plurality of gate lines connected to the pixel unit of the LCD device according to the exemplary embodiment of the present invention.

The gate signals transferred to a plurality of respective pixels of the pixel unit of the existing LCD device may be transferred through a plurality of gate lines arranged in accordance with a pixel row. As can be seen from FIG. 3, the plurality of gate signals transferred through the plurality of respective gate lines and each maintained to a gate-on voltage level during one (1) horizontal cycle (1H) are sequentially supplied, thus scanning the plurality of pixels included in a corresponding pixel row.

That is, a plurality of pixels included in each of $(n-2)^{th}$, $(n-1)^{th}$, $n^{th}$, $(n+1)^{th}$, and $(n+2)^{th}$ pixel rows may be scanned at a point of time at which each of gate signals (i.e., Gn−2, Gn−1, Gn, Gn+1, and Gn+2) transferred to corresponding gate lines rise to a high-level voltage and may be supplied with data signals through a plurality of data lines respectively connected thereto. Accordingly, the liquid crystal elements of the pixels are charged to data voltages corresponding to the respective data signals.

Referring to FIG. 3, the gate signals Gn−2, Gn−1, Gn, Gn+1, and Gn+2 rise to a high-level voltage at respective points of time at which respective periods T1, T2, T3, T4, and T5 are started and scan a plurality of pixels included in each of pixel rows. During the periods T1, T2, T3, T4, and T5, the liquid crystal element of each of the plurality of pixels may be charged to a data voltage corresponding to a received data signal.

In FIG. 3, a period Cn in which a plurality of pixels included in the $n^{th}$ pixel row may be charged to a corresponding data voltage corresponds to the period T3 (one (1) horizontal cycle) of the driving timing of a gate signal transferred through the gate line Gn through which the gate signal may be transferred to the $n^{th}$ pixel row. The period Cn is a period in which the gate signal is maintained at a high level (i.e., a gate-on voltage level).

The period Cn in which the plurality of pixels included in the $n^{th}$ pixel row may be charged to a corresponding data voltage is followed by a period Cn+1 in which a plurality of pixels included in the $(n+1)^{th}$ pixel row (i.e., a subsequent pixel row) are charged to a data voltage corresponding to a data signal. The period Cn+1 corresponds to the period T4 and also has 1 horizontal cycle (1H).

As described above, in the existing LCD device, a data voltage may be charged in a plurality of pixels included in each pixel row during a period in which a gate signal transferred to the pixel row is active in synchronization with an active point of time. The existing LCD device has a structure in which each pixel row is charged with electrons through one choice per frame. Accordingly, the circuit configuration of the existing LCD device requires an additional control signal for controlling an additional switching element in the case in which two pixels share a data line as in the present invention.

However, referring to FIG. 4, in the LCD device according to the exemplary embodiment of the present invention, a driving timing of each of gate signals (i.e., Gn−2, Gn−1, Gn, Gn+1, Gn+2, Gn+3, and Gn+4) transferred to a plurality of pixels included in each of pixel rows (i.e., $(n-2)^{th}$, $(n-1)^{th}$, $n^{th}$, $(n+1)^{th}$, $(n+2)^{th}$, $(n+3)^{th}$, and $(n+4)^{th}$) through respective corresponding gate lines have a first period and a second period in each of which the gate signal rises to a high-level voltage and remains active.

More particularly, each of the plurality of gate signals transferred to respective pixel rows has driving timing including the first period in which the gate signal rises to a high-level voltage and remains active and the second period in which the gate signal is maintained at a gate-off voltage level during twice the first period and then the gate signal rises to a high-level voltage and remains active during three times the first period.

The first periods of neighboring gate signals from among a plurality of gate signals transferred to respective pixel rows do not overlap with each other. During a period in which a gate signal is in a gate-off voltage level after the first period of the corresponding gate signal is finished, the first period of a gate signal transferred to a subsequent first pixel row may be set up.

Further, the second periods of neighboring gate signals from among a plurality of gate signals transferred to respective pixel rows overlap with each other as much as the first period. During a period of as much as the first period before the second period of the corresponding gate signal is finished, the second period of the corresponding gate signal overlaps with the second period of the gate signal transferred to the subsequent first pixel row.

Meanwhile, the second period of the corresponding gate signal overlaps with the first period of a gate signal transferred to a subsequent second row.

More particularly, for example, in FIG. 4, the driving timing of the gate signal Gn transferred to the plurality of pixels included in the $n^{th}$ pixel row through a corresponding gate line includes a first period P1 in which the gate signal Gn rises to a high-level voltage and remains active during one (1) horizontal cycle (1H), and a second period in which the gate signal Gn is maintained at a gate-off level voltage level during twice the first period P1 (i.e., periods P2 and P3), and then the gate signal rises to a high-level voltage and remains active during three times the first period P1 (i.e., periods P4 to P6).

The driving timing of the gate signal Gn+1 transferred to the plurality of pixels included in a pixel row subsequent to the $n^{th}$ pixel row is shifted back by two (2) horizontal cycles (2H) from the driving timing of the gate signal transferred to the previous pixel row.

The first periods and the second periods of a plurality of gate signals, each transferred to a plurality of pixels based on the above driving timing, may be sequentially shifted.

Accordingly, the second period of the gate signal Gn transferred to the $n^{th}$ pixel row through the gate line connected to the $n^{th}$ pixel row overlaps with the second period of the gate signal Gn+1 transferred to the $(n+1)^{th}$ pixel row (i.e., a subsequent first pixel row) during the period P6, and also overlaps with the first period of the gate signal Gn+2 transferred to the $(n+2)^{th}$ pixel row (i.e., a subsequent second row) during the period P5.

Meanwhile, the second period of the gate signal Gn transferred to the $n^{th}$ pixel row also overlaps with the second period of the gate signal Gn−1 transferred to the $(n-1)^{th}$ pixel row (i.e., a previous pixel row) during the period P4.

In the LCD device according to the exemplary embodiment of the present invention, a plurality of pixels included in each of pixel rows is classified into a plurality of pixel pairs each sharing a data line. Accordingly, although a high-level voltage is transferred from a gate signal transferred to a corresponding pixel row, both the switching elements of a pixel on one side and a pixel on the other side included in each pixel pair are not turned on.

The pixel pair 200 shown in FIG. 2 from among the plurality of pixel pairs connected to a gate line corresponding to the $n^{th}$ pixel row is described below as an example. The first switching element M1 of the pixel 201 on one side and the first switching element M1' of the pixel 203 on the other side are turned on during the periods P4 to P6, but only the second switching element M2 of the pixel 201 on one side may be turned on during the period P4. Accordingly, a data voltage transferred through the data line Dx may be transferred to only the liquid crystal pixel C. Next, during the period P5, since the second switching element M2' of the pixel 203 on the other side is turned on, a data voltage transferred through the data line Dx is transferred to only the liquid crystal the pixel C'.

As described above, the data voltage transferred through the data line is transferred to only one of a pair of the pixels according to an active state of each of a gate signal now transferred to a pixel row, a gate signal transferred to a previous pixel row, and a gate signal transferred to a subsequent second pixel row.

More particularly, the first switching elements of a pixel on one side (a pixel placed on the left side on the basis of a data line, from among a pixel pair) and a pixel on the other side (a pixel placed on the right side on the basis of the data line, from among the pixel pair) from among each of a plurality of pixel pairs included in the $n^{th}$ pixel row may be supplied with the gate signal Gn transferred through the corresponding $n^{th}$ pixel row, and may be turned on during the first period P1 and the second periods P4, P5, and P6. However, the second switching elements of the pixel on one side and the pixel on the other side are turned on only during a period corresponding to the second periods P4, P5, and P6.

More particularly, the second switching element M2 of the pixel 201 on one side is turned on during the period P4 overlapping with a period in which the gate signal Gn−1 transferred to the $(n-1)^{th}$ pixel row is active, and the second switching element M2' of the pixel 203 on the other side may be turned on only during the period P5 overlapping with a period in which the gate signal Gn+2 transferred to the $(n+2)^{th}$ pixel row is active.

The switching operations of the second switching elements of the pixel on one side and the pixel on the other side may be controlled in response to the gate signals Gn−1 and Gn+2 that are respectively connected to a gate line connected to a previous pixel row (i.e., the $(n-1)^{th}$ pixel row) and a gate line connected to a pixel row (i.e., the $(n+2)^{th}$ pixel row) subsequent to a next pixel row and are transferred.

Accordingly, during the periods P4 and P5, data voltages according to respective data signals transferred to a plurality of pixel pairs through corresponding data lines may be temporally separated from each other, thus charging the liquid crystal elements of the pixel on one side and the pixels on the other side.

A period CRn in which each of a plurality of pixel pairs included in an $n^{th}$ pixel row is charged to a data voltage according to a data signal includes the periods P4 and P5, and a period CRn+1 in which each of a plurality of pixel pairs included in a subsequent $(n+1)^{th}$ pixel row may be charged to a data voltage according to a data signal includes the periods P6 and P7 subsequent to the periods P4 and P5.

Accordingly, in the LCD device according to the exemplary embodiment of the present invention, a gate signal transferred to each of a plurality of pixels in order to drive the pixels may be used to control not only pixels included in a corresponding pixel row to which the gate signal is transferred, but also pixels included in another pixel row.

While this invention has been described in connection with what is presently considered to be exemplary embodiments, it is to be understood that the invention is not limited to the disclosed embodiments. A person having ordinary skill in the art can change or modify the described embodiments without departing from the scope of the present invention, and it will be understood that the present invention should be construed to cover the modifications or variations. Further, the material of each of the constituent elements described in the specification can be readily selected from among various known materials and replaced thereby by a person having ordinary skill in the art. Further, a person having ordinary skill in the art can omit some of the constituent elements described in the specification without deteriorating performance or can add constituent elements in order to improve performance. In addition, a person having ordinary skill in the art may change the sequence of the steps described in the specification according to process environments or equipment. Accordingly, the scope of the present invention should be determined not by the above-described exemplary embodiments, but by the appended claims and their equivalents.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) device, comprising:

a gate driver transferring a plurality of gate signals to a plurality of gate lines;

a data driver transferring a plurality of data signals to a plurality of data lines; and a pixel unit including a plurality of pixels arranged in a matrix form, wherein the pixel unit comprises a plurality of pixel pairs in each of which two corresponding pixels included in two neighboring pixel columns, respectively, and in the same pixel row, from among the plurality of pixels, are connected in common to a corresponding data line of the plurality of data lines and a corresponding gate line of the plurality of gate lines, and wherein a switching operation is controlled by a gate signal being transferred to a predetermined pixel row through a corresponding gate line that is transferred to a pixel on one side and a pixel on the other side from among a plurality of pixel pairs included in two pixel rows different from the predetermined pixel row.

2. The LCD device of claim 1, wherein during a period in which a switching element included in the pixel on one side of each of the plurality of pixel pairs is turned on and a period in which a switching element included in the pixel on the other side of the corresponding pixel pair is turned on, the pixel on one side and the pixel on the other side are charged to a data voltage according to the data signal through a corresponding data line connected in common to the pixel on one side and the pixel on the other side.

3. The LCD device of claim 2, wherein the turn-on period is one (1) horizontal cycle (1H).

4. The LCD device of claim 2, wherein the period in which the switching element included in the pixel on one side of each of the plurality of pixel pairs is turned on and the period in which the switching element included in the pixel on the other side of the corresponding pixel pair is turned on do not coincide with each other.

5. The LCD device of claim 1, wherein the two pixel rows different from the predetermined pixel row include a second pixel row anterior to the predetermined pixel row and a pixel row posterior to the predetermined pixel row.

6. The LCD device of claim 1, wherein the gate driver sequentially generates the plurality of gate signals, each having a first period in which the gate signal shifts to a gate-on voltage level and remains active, and a second period in which the gate signal is maintained at a gate-off voltage level during twice the first period and then the gate signal shifts to the gate-on voltage level and remains active during three times the first period, and transfers the generated gate signals to the plurality of gate lines, wherein the second period of a corresponding gate signal from among the plurality of gate signals overlaps with the second period of a gate signal transferred to a pixel row anterior to a pixel row to which the corresponding gate signal is transferred, and the second period of the corresponding gate signal overlaps with the first period of a gate signal transferred to a second pixel row posterior to the pixel row to which the corresponding gate signal is transferred.

7. The LCD device of claim 6, wherein the first period is one (1) horizontal cycle (1H).

8. The LCD device of claim 6, wherein each of the overlapped periods is one (1) horizontal cycle (1H).

9. The LCD device of claim 6, wherein, during each of the overlapped second periods of the corresponding gate signals from among the plurality of gate signals, a pixel on one side and a pixel on the other side of a pixel pair included in the pixel row to which the corresponding gate signal is transferred are charged to a data voltage according to the corresponding data signal.

10. The LCD device of claim 1, wherein each of the pixel on one side and the pixel on the other side of each of the plurality of pixel pairs comprises:

a first switching element, comprising a gate terminal connected to the corresponding gate line, a source terminal connected to a drain terminal of a second switching element, and a drain terminal connected to one terminal of a liquid crystal element for charging a data voltage according to a corresponding data signal; and a second switching element, comprising a gate terminal connected to either one of two gate lines corresponding to the two pixel rows different from the predetermined pixel row, a source terminal connected to the corresponding data line, and a drain terminal connected to the source terminal of the first switching element, wherein the first switching element and the second switching element are turned on depending on voltage levels of a first gate signal transferred through the corresponding gate line and a second gate signal transferred through either one of the two gate lines corresponding to the two pixel rows different from the predetermined pixel row.

11. The LCD device of claim 10, wherein the gate terminal of the second switching element of the pixel on one side is connected to a gate line corresponding to a pixel row anterior to the predetermined pixel row, and the gate terminal of the second switching element of the pixel on the other side is connected to a gate line corresponding to a second pixel row posterior to the predetermined pixel row.

12. The LCD device of claim 10, wherein the two pixel rows different from the predetermined pixel row comprise a previous pixel row of the corresponding gate line and a subsequent second pixel row of the corresponding gate line.

13. The LCD device of claim 10, wherein during a period in which the first switching element and the second switching element of the pixel on one side are simultaneously turned on and a period in which the first switching element and the second switching element of the pixel on the other side are simultaneously turned on, the pixel on one side and the pixel on the other side are charged to a data voltage according to a data signal from a corresponding data line connected in common to the pixel on one side and the pixel on the other side.

* * * * *